United States Patent
Bertogg et al.

(10) Patent No.: US 7,353,115 B2
(45) Date of Patent: Apr. 1, 2008

(54) COMPUTER SYSTEM AND METHOD FOR DETERMINING A REGIONAL IMPACT OF EARTHQUAKE EVENTS

(75) Inventors: Martin Bertogg, Zurich (CH); Atsuhiro Dodo, Tokyo (JP)

(73) Assignee: Swiss Reinsurance Company, Zurich (CH)

( * ) Notice: Subject to any disclaimer, the term of this patent is extended or adjusted under 35 U.S.C. 154(b) by 0 days.

(21) Appl. No.: 11/489,636

(22) Filed: Jul. 20, 2006

(65) Prior Publication Data
US 2008/0021659 A1    Jan. 24, 2008

(51) Int. Cl.
*G01V 1/28* (2006.01)
*G06Q 40/00* (2006.01)

(52) U.S. Cl. .............. 702/15; 705/4; 705/10
(58) Field of Classification Search ......... 702/15; 705/4, 10, 35
See application file for complete search history.

(56) References Cited

U.S. PATENT DOCUMENTS

| | | | | |
|---|---|---|---|---|
| 5,694,129 A * | 12/1997 | Fujinawa et al. | ............ | 342/22 |
| 5,839,113 A * | 11/1998 | Federau et al. | ............ | 705/4 |
| 6,336,096 B1 * | 1/2002 | Jernberg | ............ | 705/4 |
| 6,859,416 B2 * | 2/2005 | Inubushi | ............ | 367/14 |
| 2001/0027389 A1 * | 10/2001 | Beverina et al. | ............ | 703/22 |
| 2004/0012491 A1 * | 1/2004 | Kulesz et al. | ............ | 340/506 |
| 2004/0015336 A1 * | 1/2004 | Kulesz et al. | ............ | 703/11 |
| 2004/0236676 A1 * | 11/2004 | Takezawa et al. | ............ | 705/38 |
| 2005/0027571 A1 * | 2/2005 | Gamarnik et al. | ............ | 705/4 |
| 2006/0190368 A1 * | 8/2006 | Kesterman | ............ | 705/35 |

FOREIGN PATENT DOCUMENTS

| | | |
|---|---|---|
| JP | 2003-162641 | 6/2003 |
| JP | 2005-158081 | 6/2005 |

* cited by examiner

*Primary Examiner*—Donald E McElheny, Jr.
(74) *Attorney, Agent, or Firm*—Oblon, Spivak, McClelland, Maier & Neustadt, P.C.

(57) ABSTRACT

For determining the regional impact of earthquake events, geographical regions are associated with reference measuring stations located in the respective geographical region. For each of the geographical regions, regional earthquake indices are determined based on instrumental intensity values that are received from the region-specific measuring stations and indicate the strength of seismic motion. Each of the intensity values are weighted with a weighting factor assigned to the reference measuring station that provided the intensity value. Associating only selected reference measuring stations with a geographical region and weighting the intensity values with station-specific weighting factors make it possible to select reference measuring stations and weighting factors according to the geographical distribution of replacement values and, thus, to provide earthquake indices that correlate accurately with potential earthquake damages.

38 Claims, 7 Drawing Sheets

COMPUTER SYSTEM AND METHOD FOR DETERMINING A REGIONAL IMPACT OF EARTHQUAKE EVENTS

FIELD OF THE INVENTION

The present invention relates to a computer system and a method for determining a regional impact of earthquake events. Specifically, the present invention relates to a computer system and a computer-implemented method for determining parametric earthquake indices indicative of the regional or market impact of the earthquake events.

BACKGROUND OF THE INVENTION

Determining the regional impact of earthquake events is useful for getting a measure for direct and indirect regional losses from physical damages and interruptions caused by the earthquake events. Determining earthquake indices that are indicative of the regional impact of the earthquake events makes it possible to inform interested parties in a standardized fashion about the effect of earthquake events on specific geographic regions, i.e. defined geographic areas. Thus the impact of earthquake events on geographical regions can be measured for different regions with regards to a specific earthquake event and/or for one or more regions with regards to multiple earthquake events. Based on earthquake indices, it is also possible to compare and analyze the regional impact of earthquake events over different periods of time which are useful, not only when describing indices for actual historical events, but also when projecting future shifts of indices for given specific scenario cases, e.g., a scenario with hazard activity changes, or exposure/risk changes, which then can be used when building a current risk mitigation strategy. Furthermore, earthquake indices that indicate the regional impact of earthquake events make it possible to define structured financial instruments. For instance, payment based on predetermined trigger, payout pattern, and indexed loss amount would provide better transparency, smoother settlement, and more flexible coverage for clients than typical traditional insurance products. A structured regional and market parametric indices product can offer a client flexible risk transfer solutions given client specific needs such as portfolio location, and risk types and amount not only through a tailor-made product but also a combination of such standard and more reliable products. Patent applications JP 2003162641 and JP 2005158081 describe the computer-aided design of financial derivatives that are based on earthquakes. According to JP 2003162641 and JP 2005158081 a first derivative is based on the risk of an earthquake damage at the site of a target facility, primarily measured by the observed peak ground acceleration or peak ground velocity; a second derivative is based on the risk that an observation of peak ground acceleration or peak ground velocity across a predefined region affects more than a certain percentage of this region. The third derivative is based on the risk that an earthquake with a magnitude equal or higher than a given value occurs within a predefined target region. The seismic measurement values according to JP 2003162641 and JP 2005158081 are based on the peak ground acceleration (PGA) or peak ground velocity (PGV) values determined for the earthquake events.

SUMMARY OF THE INVENTION

It is an object of this invention to provide an alternative computer system and an alternative computer-implemented method for determining the regional impact of earthquake events. In particular, it is an object of the present invention to provide a computer system and a computer-implemented method for determining parametric earthquake indices, indicative of the regional or market impact of earthquake events, based on scientific seismic measurement values having a correlation with earthquake damages that in general is assumed to be higher than the correlation of peak ground acceleration or peak ground velocity values, that is easily obtainable and, most importantly, that is substantially more intuitive to non-seismologists. Such indices have a clear advantage in that they are transparent for usage in financial instruments. Furthermore, it is an object of the present invention to provide a computer system and a computer-implemented method for determining the regional impact of earthquake events, based on seismic measurement values from a set of predefined seismological measuring stations, which are representative of the regional distribution of replacement values and the associated loss potential. It is a further object of the present invention to provide a computer system and a computer-implemented method for determining the impact of earthquake events on a region comprising multiple geographical regions that are not necessarily adjacent. It is yet a further object of the present invention to provide a computer system and a computer-implemented method for determining earthquake indices suitable for defining structured financial instruments related to multiple geographical regions that are not necessarily adjacent.

According to the present invention, these objects are achieved particularly through the features of the independent claims. In addition, further advantageous embodiments follow from the dependent claims and the description.

According to the present invention, the above-mentioned objects are particularly achieved in that, for determining the regional impact of earthquake events, in a computer system, each geographical region from a set of defined geographical regions is associated with a group of reference measuring stations selected from a plurality of seismological measuring stations distributed in the respective geographical region; in that instrumental intensity values, indicative of a local strength of seismic motion, i.e. the degree of shaking at a local point on the Earth's surface, are received in the computer system from the reference measuring stations for an earthquake event; and in that determined by the computer system are earthquake indices, indicative of the regional impact of the earthquake event, the earthquake indices including at least a regional index for each of the geographical regions, each regional index being determined from the instrumental intensity values received from the reference measuring stations associated with the respective geographical region, and each of the instrumental intensity values being weighted with a weighting factor assigned to the reference measuring station having provided the instrumental intensity value. Preferably, the instrumental intensity values are weighted with a weighting factor that is based on a local replacement value (loss potential), independent of events, associated with the measuring station that has provided the instrumental intensity value. Moreover, the instrumental intensity values are preferably weighted with a second weighting factor which is dependent on events and associated with the height of the measured value at each measuring station. Thus, stations measuring a higher intensity value than others of the same geographical region are assigned a higher relative weight. The sum of these intensity weights is again normalized to 100%. Preferably, the instrumental intensity values are JMA instrumental intensity values (Japan Meteorological Agency) or JMA Shindo intensity values, which are based on the JMA instrumental intensity values. Such values are reported e.g. by JMA or NEID (National Research Institute for Earth Science and Disaster Prevention) after earthquake events on various media channels. For example, the earthquake indices are determined from the JMA instrumental intensity values or from JMA Shindo intensity values, derived from the JMA instrumental intensity values. For example, the earthquake indices for one or more earthquake events are displayed on a user interface accessible for users via a telecommunications network, e.g. on the Internet. In further embodiments, the instrumental intensity values are one or more of the spectral response measurements at 0.3, 1.0 or 3.0 second period, e.g. as reported by the US Geological Survey in their ShakeMap product, or an instrumental intensity as reported, for example, by the US Geological Survey in their ShakeMap product, in contrast to a very different instrumental intensity scale used by JMA. Associating only selected reference measuring stations with a geographical region and weighting the instrumental intensity values with station-specific value and intensity weighting factors make it possible to provide earthquake indices that correlate more accurately with potential universal earthquake damages in a region than earthquake indices based on peak ground acceleration or velocity without such weighting, because the reference measuring stations and the weighting factors can be selected according to the replacement value (loss potential) associated with the region surrounding the respective measuring station. Thereby reflected is the over-proportional impact on earthquake damage of a station measuring a higher intensity than others in the same geographical region. Furthermore, earthquake indices based on such intensity measurements allow for an intuitive and rapid post-processing after an earthquake event, requiring very little calculation. Instrumental intensity values that indicate the strength of seismic motion at a certain geographic location, particularly the JMA instrumental intensity values or JMA Shindo intensity values, have the advantage that they have a often a higher correlation with observed earthquake damages than peak ground acceleration or peak ground velocity values and that they are more intuitive and more straight-forward to assess to non-seismologists. Consequently, earthquake indices based on such seismological instrumental intensity values provide a more intuitive and often more accurate indicator for earthquake damages than earthquake indices based on peak ground acceleration or peak ground velocity values, for example. Moreover, decisions made by non-seismologist based on such seismological instrumental intensity values represent more correctly user intentions with regards to associating numeric values with earthquake damages. Determining a regional earthquake index for each of the geographical regions makes it possible to define aggregate earthquake indices from more than one regional index. Thus, it is possible to determine the impact of earthquake events on a region comprising multiple geographical regions that are not necessarily adjacent. Furthermore, it is possible to define structured financial instruments related to a portfolio of multiple geographical regions that are not necessarily adjacent, based on indices indicating accurately the regional impact of earthquake events. Such financial products may also contain conditional arrangements across multiple geographical regions, e.g. the requirement for two or more of these regions to reach a threshold level defined in the financial product.

In an embodiment, the weighting factor is set to zero for a reference measuring station that has not provided an instrumental intensity value for the earthquake event, e.g. because of a malfunction in the measuring station or in a communication link to the measuring station. The weighting factors of the remaining reference measuring stations associated with the geographical region are adjusted accordingly, e.g. the weighting factors of all reference measuring stations contributing to the regional index of a geographical region add up to 100%.

In a preferred embodiment, the earthquake indices include an aggregated index for a group of more than one of the geographical regions based on the regional indices of each of the geographical regions included in the group. For example, the computer system determines an aggregated index, indicative of the impact of the earthquake event on a group of geographical regions selected by a user (user-specific aggregated index), or on all the defined geographical regions (total aggregated index).

In a further preferred embodiment, the earthquake indices include a market index for the set of defined geographical regions based on the regional index and a regional replacement value associated with each of the defined geographical regions. Thus, for a particular earthquake event, the computer system determines a market index indicative of the total estimated loss, which is a portion of the pre-defined replacement value, in all the defined geographical regions.

In a further embodiment, the computer system requests the instrumental intensity values from the reference measuring stations at a defined period of time after occurrence of the earthquake event. Requesting the instrumental intensity values a defined period of time after the earthquake event makes it possible to base the index determination on measuring values, which have potentially been reviewed and corrected by the reporting agency.

Furthermore, if the selected primary reporting system would fail to report data suitable for assessing the index with the necessary quality or number of measuring stations (e.g. after destruction of the reporting center), the earthquake index can be pre-defined based on a secondary system (network) of measuring stations. As for the primary system (network), for the secondary system (network) weighting factors in each geographic zone are established. Based on quality criteria applicable after a qualifying earthquake event, the primary or the secondary network of measuring stations will be used for determining the earthquake indices.

In yet another preferred embodiment, received from a user through a user interface are specification instructions for selecting one or more of the defined geographical regions to be associated with a structured financial instrument, for defining one or more maximum payout values for the defined geographical regions selected for the structured financial instrument, and for defining one or more payout patterns for the defined geographical regions selected for the structured financial instrument, a payout pattern relating payout portions to instrumental intensity values. In alternative or complementary embodiments, the user interface is accessible for the user through a telecommunications network, e.g. the Internet, or the user interface is implemented stand-alone on a personal computer of the user.

In a further embodiment, a premium is calculated for the structured financial instrument based on a probabilistic earthquake model and the specification instructions, possible event correlations of the regional indices for individual earthquake events being considered in calculating the premium. In alternative or complementary embodiments, the premium is calculated on a (remote) computer that is accessible for the user through a telecommunications network, e.g. the Internet, or the premium is calculated on a personal computer of the user.

In yet a further embodiment, an estimated payout is determined for the user based on the specification instructions and historical and/or hypothetical earthquake events. In alternative or complementary embodiments, the estimated payout is determined on a (remote) computer that is accessible for the user through a telecommunications network, e.g. the Internet, or the estimated payout is determined on a personal computer of the user.

In addition to a computer system and a computer-implemented method for determining the regional impact of earthquake events, the present invention also relates to a computer program product including computer program code means for controlling one or more processors of a computer system such that the computer system performs the proposed method, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
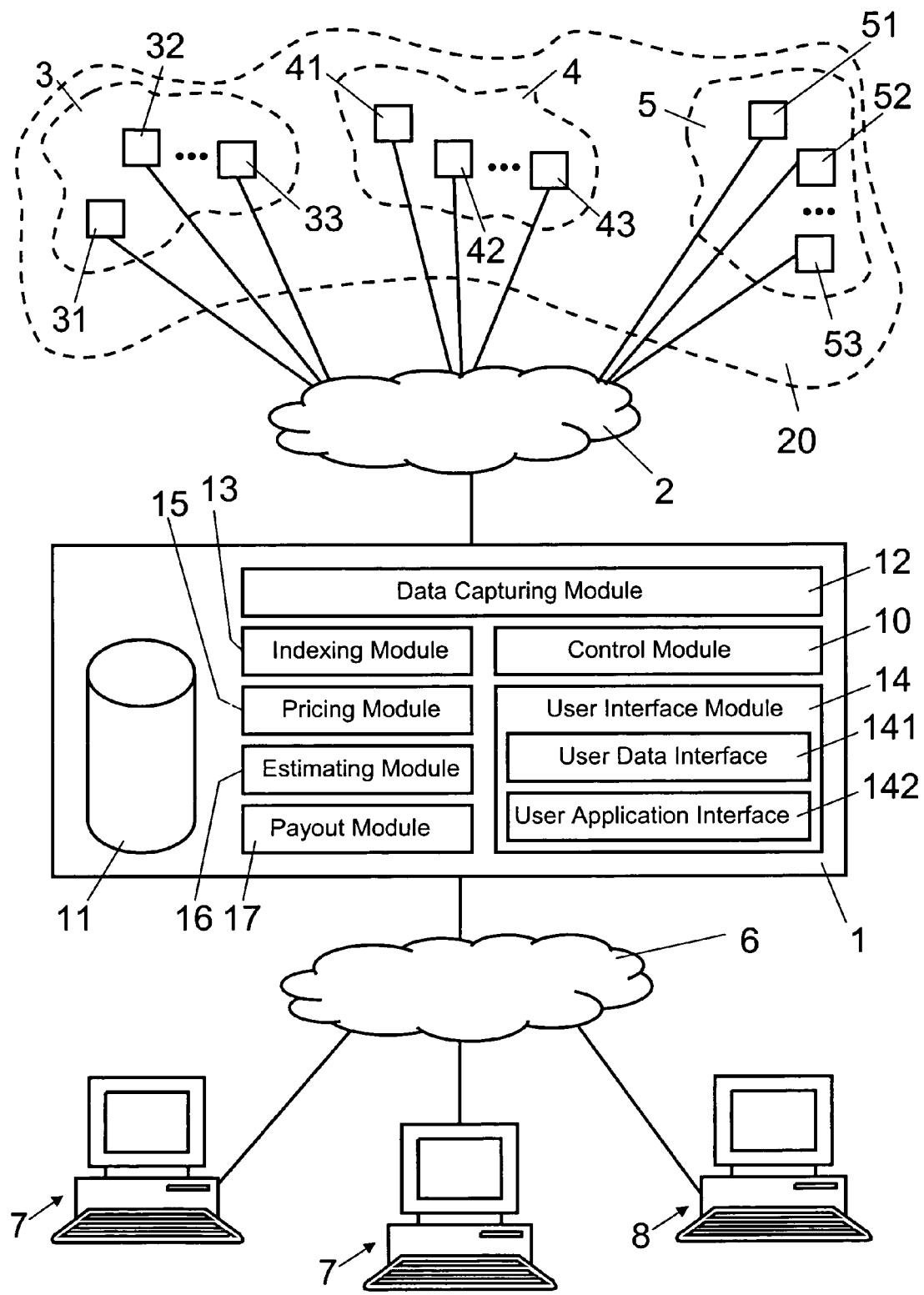
FIG. 1 shows a block diagram illustrating schematically an exemplary configuration of a computer system for practicing embodiments of the present invention, the computer system being connected to multiple seismological measuring stations located in different geographic regions.

In FIG. 1, reference numeral 1 refers to a computer system for determining a regional impact of earthquake events. Computer system 1 includes at least one computer with at least one processor. As illustrated schematically in FIG. 1, in addition, computer system 1 includes a data store 11 and multiple functional modules, namely control module 10, data capturing module 12, indexing module 13, user interface module 14 with user data interface 141 and user application interface 142, pricing module 15, estimating module 16, and payout module 17. The functional modules are implemented preferably as programmed software modules stored on a computer readable medium, connected fixed or removable to the processor(s) of computer system 1. One skilled in the art will understand, however, that the functional modules can also be implemented fully or in part by means of hardware.

As is illustrated in FIG. 1, computer system 1 is connected via a telecommunications network 2 to multiple seismological measuring stations 31, 32, 33, 41, 42, 43, 51, 52, 53 and 53. The seismological measuring stations 31, 32, 33, 41, 42, 43, 51, 52, 53 are located in different geographical regions 3, 4, or 5, respectively. The geographical regions 31, 32, 33, 41, 42, 43, 51, 52, 53 are associated with a market 4, e.g. a country. Telecommunications network 2 includes a wired or wireless network, e.g. the Internet, and/or dedicated point-to-point communication lines. The data capturing module 12 is configured for data communication via telecommunications network 2 with the seismological measuring stations 31, 32, 33, 41, 42, 43, 51, 52, 53.

Preferably, data store 11 is implemented as a database, e.g. a relational database including a database management system (DBMS). One skilled in the art will understand, however, that data store 11 may also be implemented as a data file, e.g. an electronic data spreadsheet, or as a data table within a computer program, for example. Data store 11 includes data structures and data elements representing historical and/or hypothetical earthquake events, earthquake indices, geographical regions, seismological measuring stations associated with the geographical regions, replacement values associated with the geographical regions, structured financial instruments, as well as users. The data representing a historical earthquake event includes identification information, e.g. a name and/or an event identifier, an earthquake magnitude, an event location, e.g. coordinates including latitude and longitude, and possibly an effective loss associated with the earthquake event and an instrumental intensity value such as a JMA instrumental intensity value or JMA Shindo intensity value for each and every measuring station, as long as this intensity value reaches a certain, pre-defined threshold. These intensity measures are derived either from historical observation or based on standard earthquake risk modeling techniques. The data representing earthquake may include, for specific earthquake events, regional indices associated with the regional regions, aggregate indices based on the regional indices for multiple or all the geographical regions, and/or market indices based on the regional indices and regional replacement values associated with all the geographical regions, for example. The data representing a geographical region includes a name, an identification number, location, border and/or size information, and/or a reference to a map comprising an outline of the geographical region. The data representing a seismological measuring station includes location information, a replacement value of the region surrounding the measuring station and/or a weighting factor. The data representing a structured financial instrument includes identification information of one or more of the geographical regions to be associated with the financial instrument, one or more maximum payout values for the selected geographical regions, one or more payout patterns for the selected geographical regions, and/or identification information of a user associated with the financial instrument. The data representing replacement values includes abstract or monetary values of (insured or insurable) objects such as buildings, bridges, highways, power lines, communication lines, manufacturing plants or power plants, etc., or abstract or monetary values relating to economic values created in the geographical region, e.g. by manufacturing or by selling goods to customers in the specified region.

In FIG. 1, reference numerals 7 and 8 refer to communication terminals, e.g. personal computers, laptop computers, personal data assistants and/or mobile telephones, for accessing computer system 1 via telecommunications network 6. Telecommunications network 6 includes a wired communications network, e.g. the Internet, and/or a wireless communications network, e.g. a GSM-network (Global System for Mobile Communication), an UMTS-network (Universal Mobile Telecommunications System) or a WLAN (Wireless Local Region Network). Particularly, communication terminals 7, 8 are configured to interact with user interface module 14, e.g. by means of a conventional Internet browser (e.g. Internet Explorer by Microsoft Inc. or Mozilla by the Mozilla Foundation), an execution platform (e.g. a Java Runtime Environment by Sun Microsystems Inc.) and/or a client application.

Figure 3:
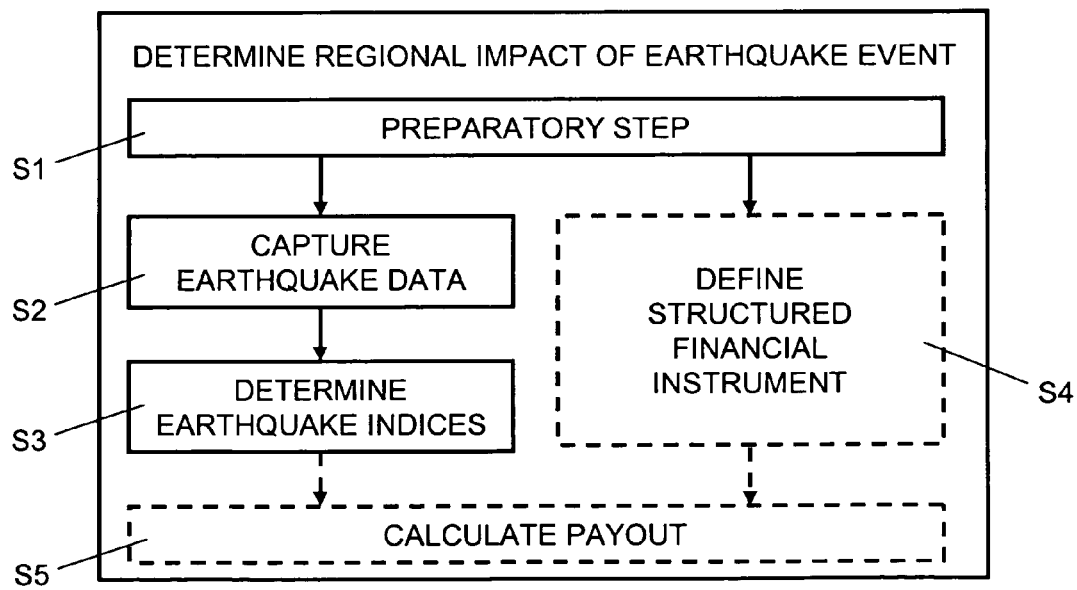
FIG. 3 shows a flow diagram illustrating an example of a sequence of steps executed for determining the regional impact of earthquake events.

As illustrated in FIG. 3, for determining the regional impact of earthquake events, first a preparatory step S1 is executed. Subsequently, in step S2, data related to an earthquake event is captured. In step S3, for the earthquake event, earthquake indices are determined. Optionally, in step S4, defined is a structured financial instrument based on the earthquake indices. In step S5, a possible payout is determined based on the earthquake indices and the defined structured financial instrument.

Figure 4:
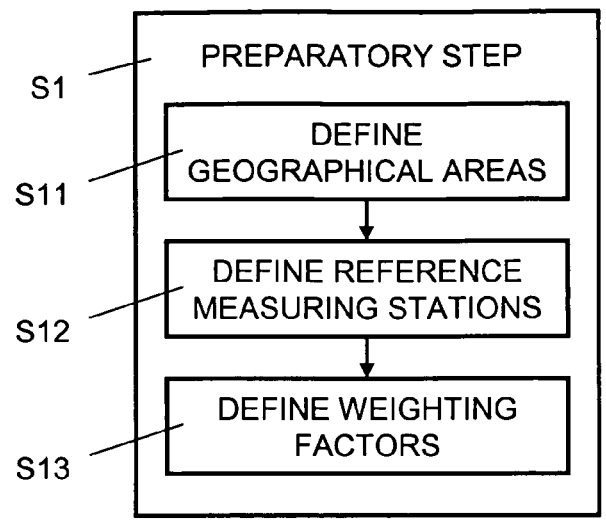
FIG. 4 shows a flow diagram illustrating an example of a sequence of preparatory steps executed according to the present invention.

Control module 10 is configured to execute preparatory step S1 including steps S11, S12 and S13. As illustrated in FIG. 4, in step S11, control module 10 defines the set of geographical regions stored in data store 11. For example, to define the geographical regions, control module 10 receives respective operator instructions through a computer terminal connected to computer system 1 or reads respective definition files from a data store. In step S12, for each of the defined geographical regions, control module 10 selects from the seismological measuring stations located in the geographical region 3, 4, 5 the seismological reference measuring stations 31, 32, 33, 41, 42, 43, 51, 52, 53 that are to be associated with the geographical region. For example, to select the seismological reference measuring stations 31, 32, 33, 41, 42, 43, 51, 52, 53 that are to be associated and assigned to the defined geographical regions, control module 10 receives respective operator instructions through a computer terminal connected to computer system 1 or reads respective definition files from a data store. In step S13, for each of the reference measuring stations 31, 32, 33, 41, 42, 43, 51, 52, 53, control module 10 defines an initial weighting factor. The weighting factors are determined based on the replacement values associated with the respective reference measuring station 31, 32, 33, 41, 42, 43, 51, 52, 53. For each geographical region, the weighting factors assigned to its reference measuring stations 31, 32, 33, 41, 42, 43, 51, 52, 53 add up to an integral unit, e.g. 100%.

Figure 5:
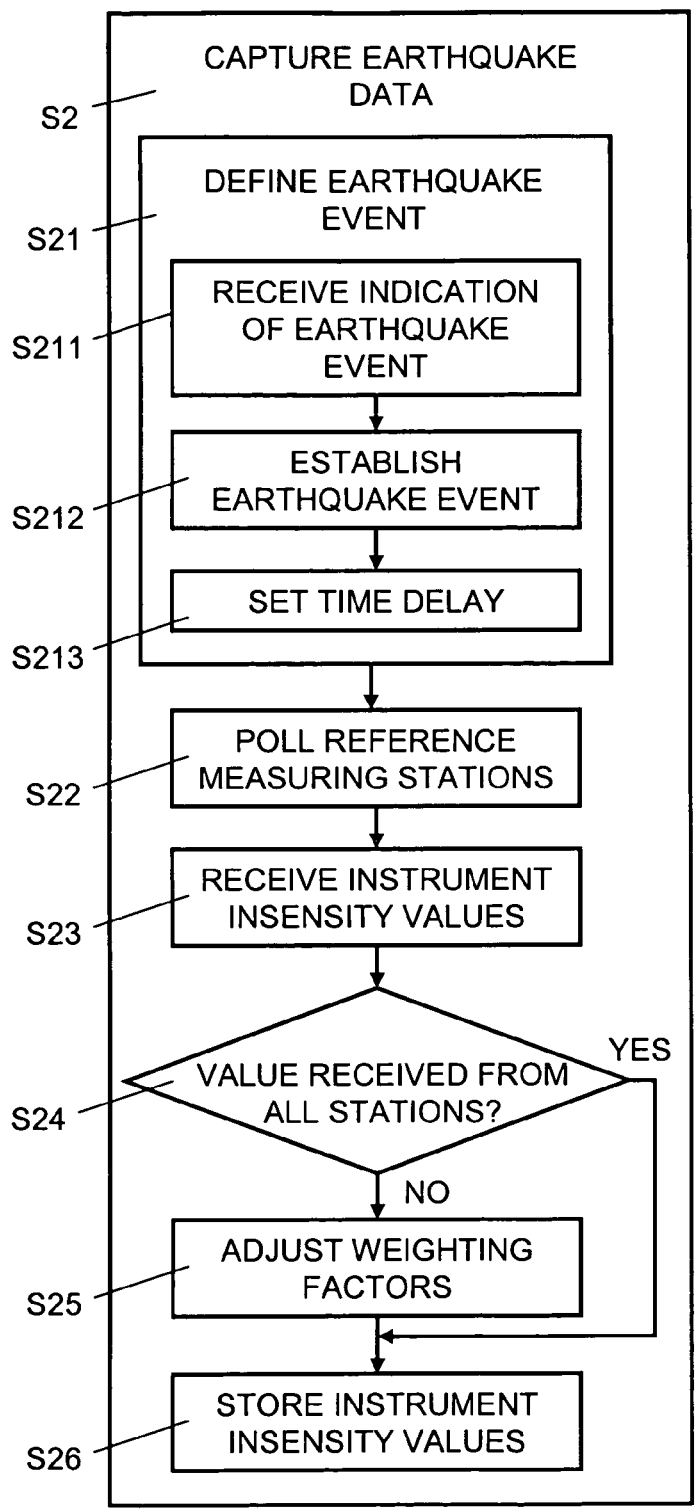
FIG. 5 shows a flow diagram illustrating an example of a sequence of steps executed according to the present invention for capturing instrumental earthquake intensity values.

Data capturing module 12 is configured to execute step S2 including steps S21, S22, S23, S24, S25 and S26. As illustrated in FIG. 5, in step S21, data capturing module 12 defines an earthquake event in data store 11. In step S211, data capturing module 12 receives an indication of the occurrence of an earthquake event from one or more of the reference measuring stations 31, 32, 33, 41, 42, 43, 51, 52, 53, for example. In step S212, for the earthquake event reported in step S211, data capturing module 12 establishes an earthquake event in data store 11 by creating and storing a respective data structure, for example, if the intensity of the earthquake event exceeds a defined threshold value at one or several of the selected measuring stations. In step S213, data capturing module 12 sets a deadline, e.g. one or two weeks or months in the future, for polling the reference measuring stations 31, 32, 33, 41, 42, 43, 51, 52, 53.

At the deadline set in step S213, in step S22, data capturing module 12 requests the reference measuring stations 31, 32, 33, 41, 42, 43, 51, 52, 53 to return the instrumental intensity values measured for the local strength of seismic motion of the earthquake event reported in step S211.

In step S23, data capturing module 12 receives the instrumental intensity values from the reference measuring stations 31, 32, 33, 41, 42, 43, 51, 52, 53. For example, the instrumental intensity values are JMA instrumental intensity values (Japan Meteorological Agency) or JMA Shindo intensity values, which are based on the JMA instrumental intensity values.

In an alternative embodiment, data capturing module 12 receives the instrumental intensity values from the reference measuring stations 31, 32, 33, 41, 42, 43, 51, 52, 53 without any delay and/or pulling requests.

In step S24, data capturing module 12 checks whether or not all the reference measuring stations 31, 32, 33, 41, 42, 43, 51, 52, 53 returned an instrumental intensity value for the earthquake event. If at least one of the reference measuring stations 31, 32, 33, 41, 42, 43, 51, 52, 53 did not report an instrumental intensity value, e.g. because of a malfunction during the earthquake event, in step S25, data capturing module 12 adjusts the weighting factors assigned to the reference measuring stations 31, 32, 33, 41, 42, 43, 51, 52, 53. Particularly, for the earthquake event established in step S212, the weighting factor assigned to the malfunctioning measuring station is set to zero, while the weighting factors assigned to the remaining measuring stations in a single geographic region 3, 4 or 5 are adjusted accordingly, e.g. so that the weighting factors for a single geographic region still add up to 100%. Otherwise, if there is no malfunction associated with the reference measuring stations 31, 32, 33, 41, 42, 43, 51, 52, 53, data-capturing module 12 proceeds in step S26.

In a further embodiment, if at least a defined portion (e.g. 30% or 100%) of the reference measuring stations 31, 32, 33, 41, 42, 43, 51, 52, 53 did not report an instrumental intensity value or if the quality of the reported data does not meet defined quality criteria, data capturing module 12 captures the instrumental intensity values measured by the reference measuring stations of a secondary network, e.g. K-NET, that is used as a backup network to the primary network, e.g. JMA, thus steps S22 and S23 (and subsequent steps S24 and S25) are repeated for the reference measuring stations of the secondary network.

It must be emphasized that, in a simplified embodiment, data capturing module 12 is configured to receive the instrumental intensity values through manual entry from an operator or through on-line download from a networked server, e.g. from a website on the Internet.

In step S26, for the earthquake event established in step S212, data capturing module 12 stores the received instrumental intensity values assigned to the regional region that comprises the reference measuring station that provided the intensity value $x_{it}$, the measured local intensity at a location i at time t. Here i is a local measuring station i={1, 2, ..., $n_i$} for a region j, and t is an event, or time of an event which can be actual or simulated hypothetical. Furthermore, data capturing module 12 assigns to each of the instrumental intensity values the (adjusted) weighting factor $u_i$ associated with the reference measuring station i that provided the intensity value, plus in a second step, the weighting factor $v_i$ relating to the measured intensity level.

Figure 6:
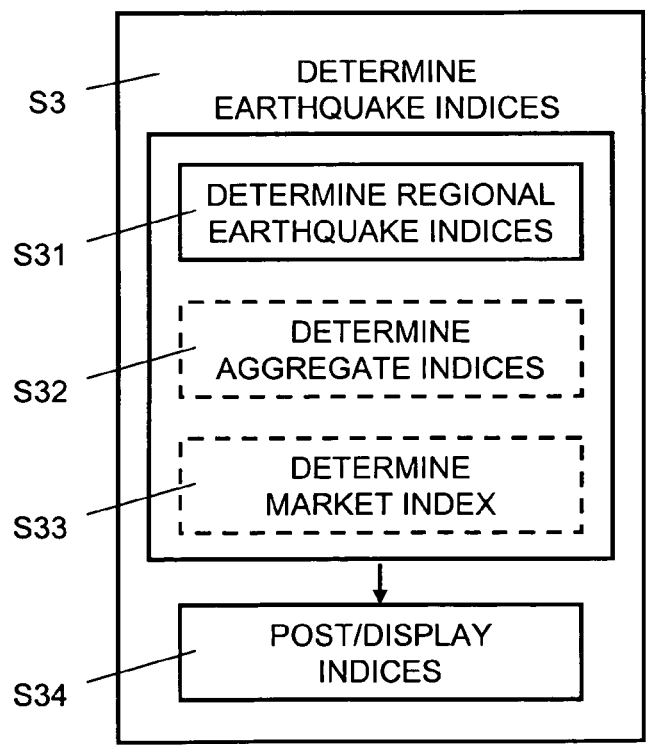
FIG. 6 shows a flow diagram illustrating an example of a sequence of steps executed according to the present invention for determining earthquake indices.

Indexing module 13 is configured to execute step S3 including steps S31, S32, S33 and S34. As illustrated in FIG. 6, in step S31, for the earthquake event established in step S212, indexing module 13 determines the regional earthquake intensity. For each of the defined regional regions 3, 4, 5, the regional intensity $y_{jt}$ for the earthquake event is calculated as an average intensity based on the instrumental intensity values $x_{it}$ assigned to the regional region 3, 4, 5 and the weighting factors $u_i$ and $v_i$ assigned to the instrumental intensity values $x_{it}$.

$$y_{jt} = \sum_{i}^{n_j} u_i v_i x_{it}, \forall j, t$$

Subsequently, in step S31, indexing module 13 determines for each of the defined regional areas 3, 4, 5, the regional index at the region j at time t.

$$\beta_{jt} = f_j\{y_{jt}\} \forall j, t$$

In an optional step S32, the aggregate earthquake indices $\alpha_t^k$ are calculated for one or more groups of the geographical regions 3, 4, 5, based on the regional indices $\beta_{jt}$ determined for the geographical regions included in the respective group. For example, an aggregate index for a single earthquake event is calculated as a weighted sum of regional earthquake indices. The weighting factor $w_j^k$ is typically based on a predefined value distribution across the regions under consideration.

$$\alpha_t^k = \sum_{j}^{n_j} w_j^k \beta_{jt} = \sum_{j}^{n_j} w_j^k f_j\{y_{jt}\}, \forall t, k$$

It is also possible to determine an aggregate earthquake index for a specific geographical region or several geographical regions based on multiple earthquake events that occurred within a defined period of time.

In optional step S33, indexing module 13 determines an earthquake market index $\alpha_t^M$ for the earthquake event established in step S212. For this purpose, each regional intensity $y_{jt}$ is connected to the pre-selected payout function $f_j\{*\}$, resulting in a payout ratio $\beta_{jt}$ for each region j, which is part of the market under consideration. Multiplying $\beta_{jt}$ with the regional replacement value (in analogy to the weighting factor as used above) $w_j^k$ results in the regional loss contribution. The sum of all regional loss contribution for all geographical regions which form part of the market, M, results in the market loss index $\alpha_t^M$. In the example figure, the earthquake market index $\alpha_t^M$ is calculated for the defined geographical regions 3, 4, 5 based on the regional indices $\beta_{jt}$ and regional replacement values $w_j^k$ associated with the respective geographical region 3, 4, 5.

$$\alpha_t^M = \sum_{j \in M} w_j^k \beta_{jt}, \forall t$$

One skilled in the art will understand, that it is also possible to determine earthquake market indices $\alpha_t^M$ for a subgroup of the defined geographical regions 3, 4, 5 and/or for a single or multiple earthquake events t that occurred within a defined period of time.

In step S34, indexing module 13 stores the earthquake indices calculated in steps S31, S32 and/or S33. Particularly, indexing module 13 makes the earthquake indices available to users through the user interface module 14 so that the earthquake indices are shown on displays of the communication terminals 7, 8. For example, earthquake indices specific to an earthquake event, are displayed as part of a list of earthquake events that can be selected, sorted, and filtered by the users through the user data interface module 141.

Figure 7:
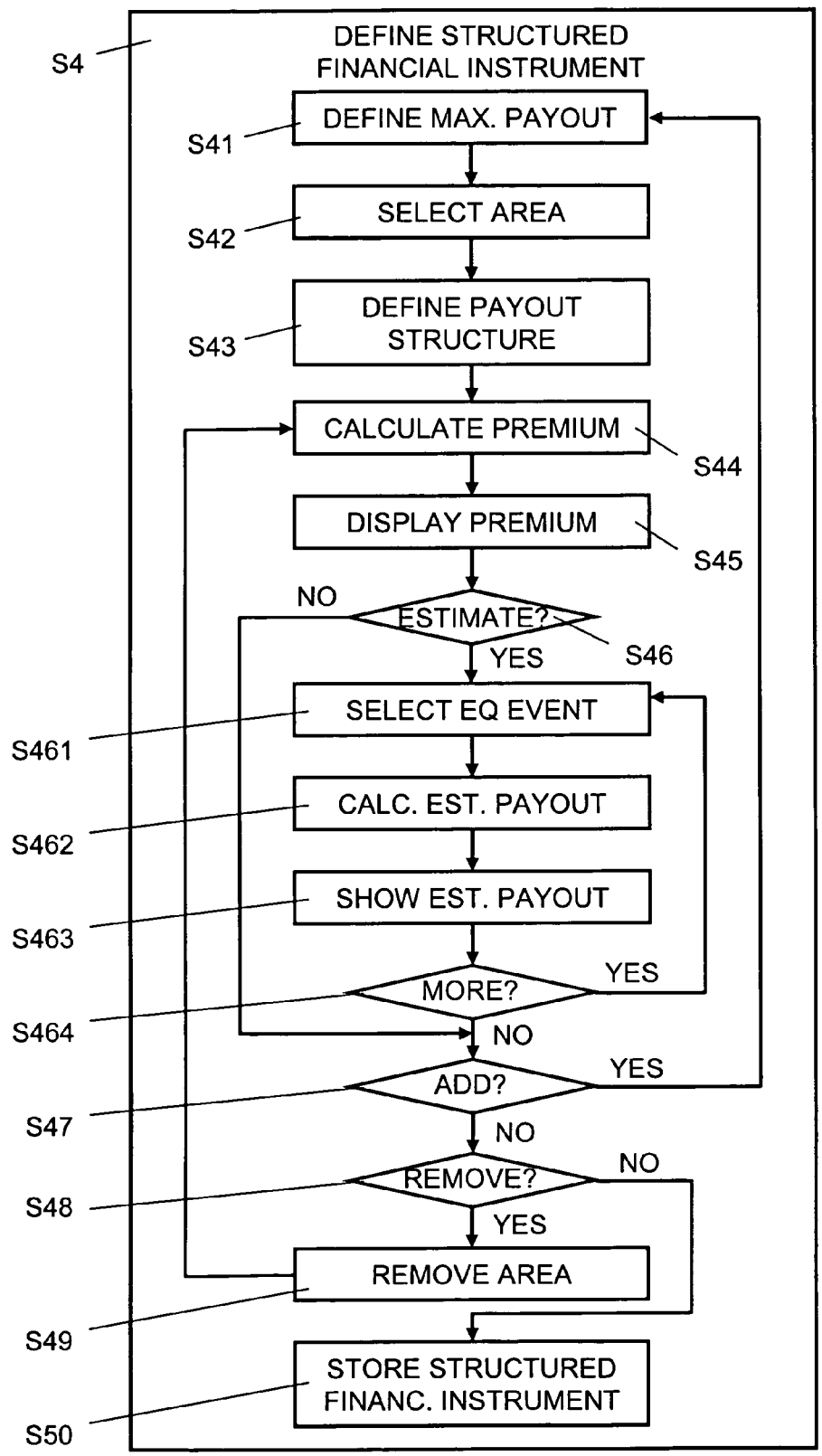
FIG. 7 shows a flow diagram illustrating an example of a sequence of steps executed according to the present invention for defining a structured financial instrument.

User application interface 142 is configured to execute step S4 including steps S41, S42, S43, S44, S45, S46, S461, S462, S463, S464, S47, S48, S49 and S50. As illustrated in FIG. 7, in response to a user instruction requesting the definition of a structured financial instrument (product), in step S41, user application interface 142 receives from the user instructions for defining a maximum payout value for the structured financial instrument. For example, the maximum payout value is defined by a number of units, a unit corresponding to a defined monetary amount, e.g. 10,000,000 Yen.

In step S42, user application interface 142 receives from the user instructions for selecting one of the defined geographical regions 3, 4, 5 to be associated with the structured financial instrument.

In an embodiment, different maximum payout values can be associated by the user with different geographical regions; thus, the sequential order of steps S41 and S42 may be reversed.

Figure 8:
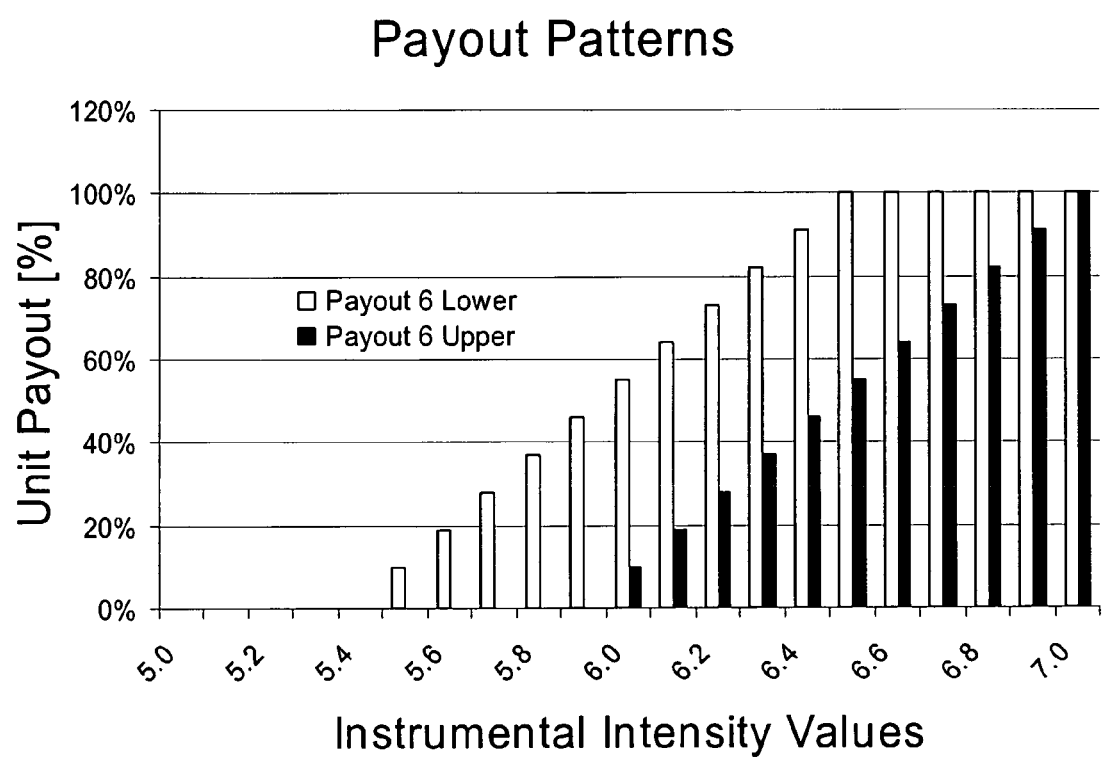
FIG. 8 shows examples of different payout patterns.

In step S43, user application interface 142 receives from the user instructions for defining a payout pattern for the geographical region(s) selected in step S42. Different payout patterns may be associated by the user with different geographical regions. The payout pattern relates payout portions to instrumental or Shindo intensity values of an earthquake event. FIG. 8 shows two examples of different payout patterns: "Payout 6 Lower", marked white, and "Payout 6 Upper", marked black. As is shown in FIG. 8, "Payout 6 Lower" defines a payout pattern where payout starts with a payout of 10% of the maximum payout value at an instrumental intensity value of 5.5. According to "Payout 6 Lower", payout continues in 10%-increments for every increase of the instrumental intensity value of 0.1, so that the maximum payout is reached at an instrumental intensity value of 6.5. On the other hand, "Payout 6 Upper" defines a payout pattern starting with a payout of 10% at an instrumental intensity value of 6.0, and continuing in 10%-increments so that the maximum payout is reached at an instrumental intensity value of 7.0. In an embodiment, user application interface 142 makes it possible for the user to define his own payout pattern, by assigning payout portions to instrumental intensity values.

Figure 9:
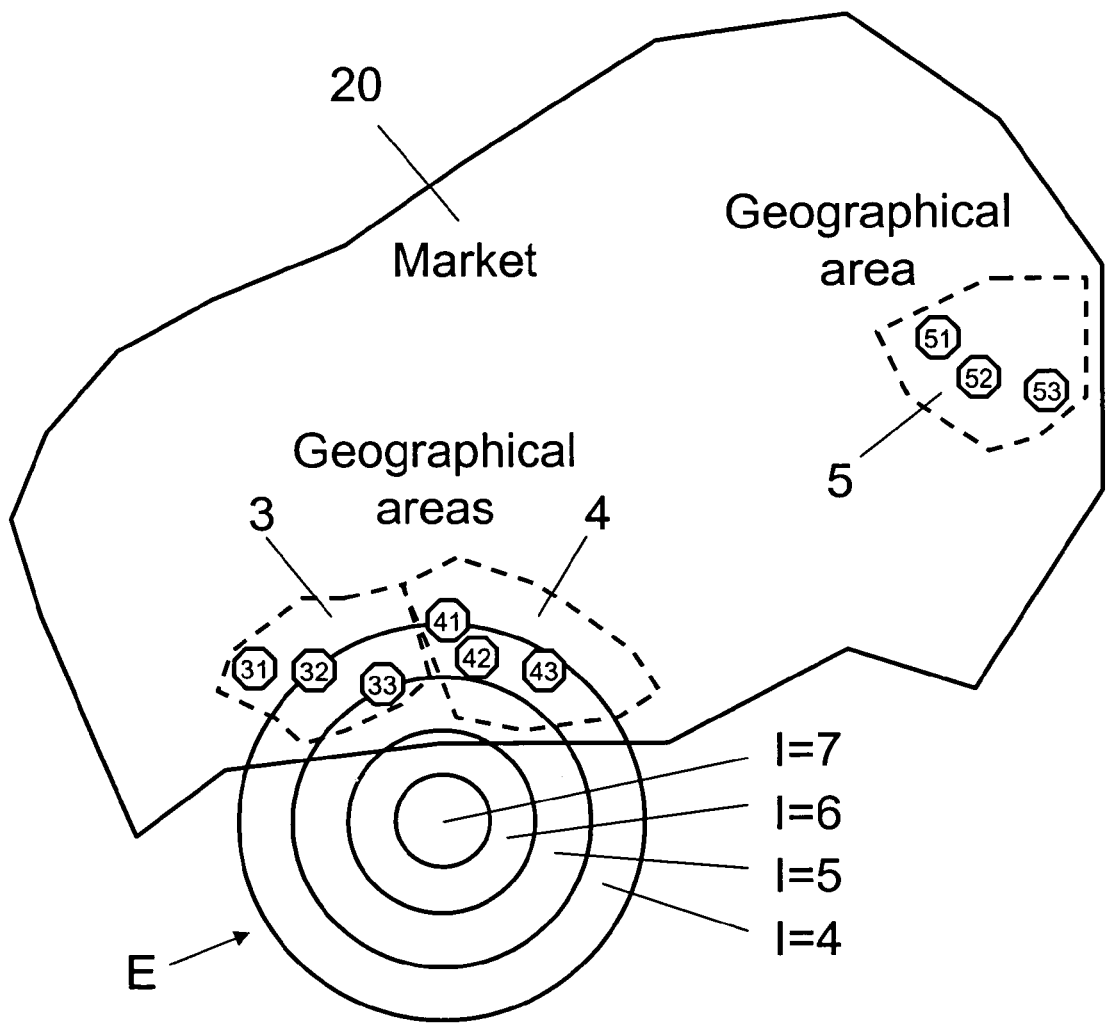
FIG. 9 shows a block diagram illustrating schematically an example of a market comprising different geographic regions with seismological measuring stations, and an earthquake event leading to event loss correlation in two adjacent geographical regions.

In step S44, the user application interface 142 triggers execution of pricing module 15 to calculate a premium for the structured financial instrument defined thus far in steps S41, S42 and S43. Alternatively, the premium is calculated once the user completes the definition of the structured financial instrument. The premium for the structured financial instrument, as defined by the selected geographical region(s), the maximum payout value(s), and the selected payout pattern(s), is calculated based on a probabilistic earthquake model. Possible correlations of the regional indices for individual earthquake events are considered in calculating the premium. In FIG. 9, illustrated is an earthquake event leading to correlation of loss events in geographical regions 3 and 4.

The premium for a financial instrument will be built from three components. Component 1 corresponds to the expected loss costs for the predefined duration of the instrument, component 2 corresponds to capital costs incurring by setting aside capital by the instrument issuer in order to be prepared for a potential payout, component 3 corresponds to set-up costs and profit loading.

Component 1 is assessed based on state-of-the art probabilistic earthquake modeling technique. One skilled in the art can easily see, that such a standard modeling technique allows to derive the probability of a certain intensity value being reached at a measuring station in a pre-defined time span. Furthermore, he can easily see, that this technique also allows to assess the same probability at several measuring stations for the same modeled, synthetic earthquake event and hence allows for taking into account the correlation of measuring stations to each other. Such a probability is derived by evaluating a series of synthetic earthquakes representing the complete spectrum of possible earthquakes affecting the region under consideration. For each synthetic earthquake with its own specific probability of occurrence, this model predicts the intensity at each of the pre-defined measuring stations. As for a real event and in parallel to the earlier described procedure to derive an earthquake index, the model derives for each geographical region the earthquake index, after applying value and intensity weighting per measuring station i. As for a real earthquake event, the model assesses the impact of the synthetically predicted earthquake index on the financial product, by referencing the payout pattern with the intensity measure in a geographic zone. It derives the overall index loss $\alpha_t^k$ for each synthetic earthquake event t by summing up the regional payouts $\beta_{jt}$.

The expected loss cost $\mu^k$ is derived by summing up the index loss per event $\alpha_t^k$ for all representative synthetic events, which are weighted by their expected probability $p_t$ of occurrence in the time span of the financial instrument. Here $\Omega$ is subset of hypothetical events, $t \in \Omega$ $$\mu_k = \Sigma_{t \in \Omega} p_t \alpha_t^k, \forall k$$

Component 2 and 3 of the premium calculation correspond to standard business practice.

In step S45, user application interface 142 shows the calculated premium to the user on the display of the communication terminal 7, 8.

In step S46, user application interface 142 receives from the user instructions indicating that the user requests an estimate of a possible payout for the structured financial instrument defined thus far. Alternatively, an estimate is available only after the user completes the definition of the structured financial instrument. If the user requested an estimate, user application interface 142 proceeds in step S461; otherwise, if no estimate was requested, user application interface 142 proceeds in step S47. In step S461, user application interface 142 triggers execution of estimating module 16 which receives from the user instructions for selecting an earthquake event, e.g. from a list of historical or hypothetical earthquake events. In step S462, estimating module 16 calculates an estimated payout that the user would receive for the structured financial instrument defined thus far, if an earthquake event corresponding to the selected earthquake event occurred.

For this purpose, in step S462, estimating module 16 collects from the database for each geographical region j for all the stations within this region j the station-specific $x_{it}$ value. Each regional intensity $y_{jt}$ is calculated based on the earlier described weighting scheme and inserted into the payout function $f_j\{*\}$, resulting in a payout ratio $\beta_{jt}$ for each region j based on $y_{jt}$, which is part of the market under consideration. Multiplying $\beta_{jt}$ with the regional replacement value $w_j^k$ results in the regional loss contribution. The sum of all the loss contribution for all geographical regions which form part of the user-defined financial product results in the product loss index $\alpha_t^k$. In the example figure, the earthquake market index $\alpha_t^M$ is calculated for the defined geographical regions 3, 4, 5 based on the regional indices $\beta_{jt}$ and regional replacement values $w_j^k$ associated with the respective geographical region 3, 4, 5.

$$\alpha_t^k = \sum_j^{n_j} w_j^k \beta_{jt} = \sum_j^{n_j} w_j^k f_j\{y_{jt}\}, \forall t, k$$

In step S463, estimating module 16 shows the estimated payout $\alpha_t^k$ to the user on the display of the communication terminal 7, 8. In step S464, estimating module 16 receives from the user instructions indicating whether or not the user requests another estimate. If the user requested another estimate, estimating module 16 proceeds in step S461; otherwise, user application interface 142 proceeds in step S47.

In step S47, user application interface 142 receives from the user instructions indicating whether or not the user wants to add another geographical region to the structured financial instrument. If the user wants to add a geographical region, user application interface 142 proceeds in step S42; otherwise, user application interface 142 proceeds in step S48.

In step S48, user application interface 142 receives from the user instructions indicating whether or not the user wants to remove a geographical region from the structured financial instrument. If the user wants to remove a geographical region, user application interface 142 proceeds in step S49; otherwise, user application interface 142 proceeds in step S50.

In step S49, user application interface 142 receives from the user instructions for selecting one or more of the selected geographical regions 3, 4, 5 to be removed from the structured financial instrument. Subsequently, user application interface 142 removes these geographical regions from the structured financial instrument and proceeds in step S44.

In step S50, stores the structured financial instrument, i.e. the associated maximum payout value, geographical region(s), payout pattern(s) and premium assigned to the user. Preferably, a cover period, e.g. one year starting from an initiation date, is assigned to the structured financial instrument.

As illustrated in FIG. 3, in step S5, for the defined structured financial instruments, payout module 17 calculates an effective payout based on the earthquake indices determined for earthquake events that occurred within the respective cover periods. The same process as for event loss estimation is applicable for a real event. Instead of collecting the station specific intensity values $x_{it}$ values from the database, the $x_{it}$ values are collected as described in step S2 from the reporting agency.

$$\alpha_t^k = \sum_j^{n_j} w_j^k \beta_{jt} = \sum_j^{n_j} w_j^k f_j\{y_{jt}\}, \forall t, k$$

Figure 2:
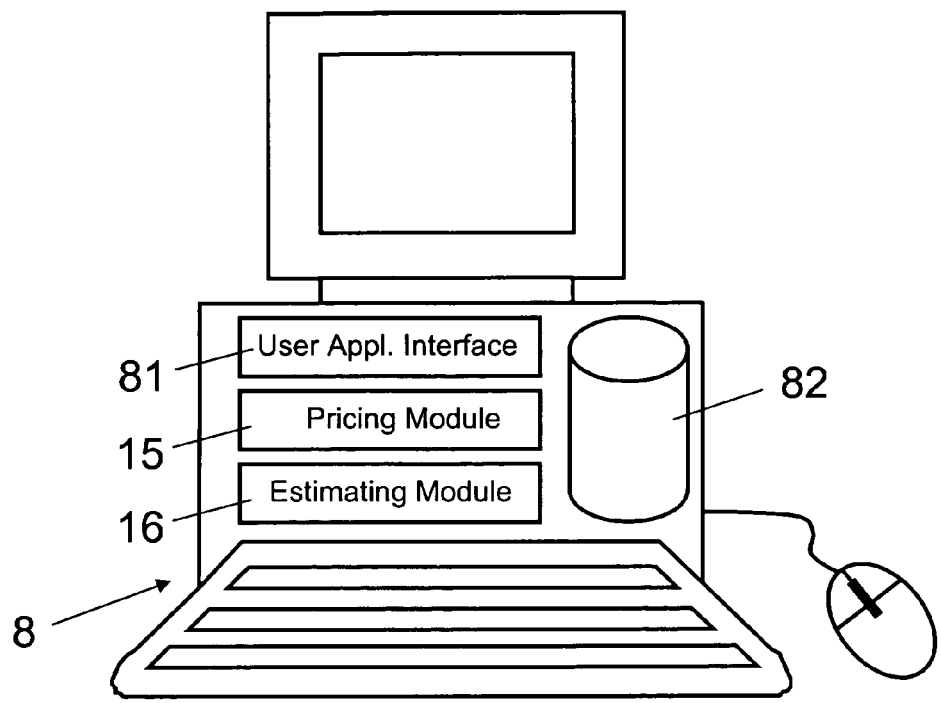
FIG. 2 shows a block diagram illustrating schematically an exemplary configuration of a computer system for practicing embodiments of the present invention, the computer system being configured for defining a structured financial instrument.

In the embodiment illustrated in FIG. 2, communication terminal 8 includes user application interface 81, data store 82, pricing module 15 and estimating module 16. Essentially, the functionality of user application interface 81 corresponds to the functionality of user application interface 142; however, specification, pricing and estimating of the structured financial instrument is performed independently from computer system 1 on (stand-alone) communication terminal 8. Thus, for that purpose, data store 82 includes data structures and data elements representing historical and/or hypothetical earthquake events, geographical regions, replacement values associated with the geographical regions, and structured financial instruments defined by the user. The structured financial instruments defined by the user are submitted to computer system 1, for storage on data store 11, through telecommunications network 6 or through other communication channels.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims.

Overview of variables and indices:

| | |
|---|---|
| $f_j\{*\}$ | Payout non-linear function at a region j against regional intensity $y_j$. This payout function can be a default function or user-specific function, both calculated by payout patterns for different risk types. |
| i | A local measuring station. $i = \{1, 2, \ldots, n_i\}$ for a region j. |
| j | A region consisting of measuring stations i. |
| k | Aggregate portfolio consisting of regions $j = \{1, 2, \ldots, n_j\}$. |
| t | An event, or time of an event. Events can be actual or simulated hypothetical. |
| M | Subset of Market region, $k \in M$ |
| $p_t$ | Annual probability of event occurrence for an event t. |
| $u_i$ | Weighting factor for local replacement value. Shows relative importance of the measuring station location in a region which is independent of events. |
| $v_i$ | Weighting factor for local measurement adjustment at a local point i. Shows relative importance of the measured intensity in a region, dependent of event t. $\sum_i^{n_j} u_i v_i = 1, \forall j,$ and $v_i$ is a function of $x_{it}$. |
| $w_j^k$ | Weighting factor for a region j's contribution to an aggregate portfolio k. |
| $x_{it}$ | Measured local intensity at a location i at time t. |
| $y_{jt}$ | Adjusted (and filtered) regional intensity at a region j at time t. $y_{jt} = \sum_i^{n_j} u_i v_i x_{it}, \forall j, t$ |
| $\alpha_t^k$ | Aggregated/market index at time t for aggregate portfolio k. $\alpha_t^k = \sum_j^{n_j} w_j^k \beta_{jt} = \sum_j^{n_j} w_j^k f_j\{y_{jt}\}, \forall t, k$ |
| $\beta_{jt}$ | Regional index at a region j at time t. $\beta_{jt} = f_j\{y_{jt}\} \forall j,t$ |
| $\mu^k$ | Annual expected loss for an aggregate portfolio k given subset of hypothetical events $t \in \Omega$. $\mu^k = \sum_{t \in \Omega} p_t \alpha_t^k, \forall k$ |
| $\Omega$ | Subset of hypothetical event, $t \in \Omega$ |

The invention claimed is:

1. A computer system for determining a regional impact of earthquake events, the system comprising:
   means for associating each geographical region from a set of defined geographical regions with a group of reference measuring stations selected from a plurality of seismological measuring stations distributed in the respective geographical region;
   a data capturing module configured to receive from the reference measuring stations, for an earthquake event, instrumental intensity values indicative of a local strength of seismic motion; and
   an indexing module configured to determine earthquake indices indicative of the regional impact of the earthquake event, the earthquake indices including at least a regional index for each of the geographical regions, each regional index being determined from the instrumental intensity values received from the reference measuring stations associated with the respective geographical region, and each of the instrumental intensity values being weighted with a weighting factor assigned to the reference measuring station having provided the instrumental intensity value.

2. The system according to claim 1, wherein the indexing module is further configured to weight each of the instrumental intensity values with a weighting factor that is based on a local replacement value associated with the measuring station having provided the instrumental intensity value.

3. The system according to claim 1, wherein the indexing module is further configured to set the weighting factor to zero for a reference measuring station not having provided an instrumental intensity value for the earthquake event.

4. The system according to claim 1, wherein the indexing module is further configured to weight each of the instrumental intensity values with a weighting factor that is based on a height of the instrumental intensity value measured at the respective measuring station.

5. The system according to claim 1, wherein the indexing module is further configured to determine for the earthquake event an aggregated index for a group of more than one of the geographical regions based on the regional indices of each of the geographical regions included in the group.

6. The system according to claim 1, wherein the indexing module is further configured to determine for the earthquake event a market index for the set of defined geographical regions based on the regional index and a regional replacement value associated with each of the defined geographical regions.

7. The system according to claim 1, wherein the data capturing module is further configured to request the instrumental intensity values from the reference measuring stations at a defined period of time after occurrence of the earthquake event.

8. The system according to claim 1, wherein the data capturing module is further configured to receive the instrumental intensity values from the reference measuring stations associated with a secondary backup network in cases when at least a defined portion of the reference measuring stations associated with a primary network fail to provide an instrumental intensity value.

9. The system according to claim 8, further comprising a user interface accessible for users via a telecommunications network and configured to display the earthquake indices for one or more earthquake event.

10. The system according to claim 1, further comprising a user interface configured to receive from a user specification instructions for selecting one or more of the defined geographical regions to be associated with a structured financial instrument, for defining one or more maximum payout values for the defined geographical regions selected for the structured financial instrument, and for defining one or more payout patterns for the defined geographical regions selected for the structured financial instrument, a payout pattern relating payout portions to instrumental intensity values.

11. The system according to claim 10, further comprising a pricing module configured to calculate a premium for the structured financial instrument based on a probabilistic earthquake model and the specification instructions, possible correlations of the regional indices for individual earthquake events being considered in calculating the premium.

12. The system according to claim 10, further comprising an estimating module configured to determine for a user an estimated payout based on the specification instructions and at least one of historical earthquake events and hypothetical earthquake events.

13. The system according to claim 1, wherein the instrumental intensity values are one of JMA instrumental intensity values, JMA Shindo intensity values, spectral response measurements at 0.3, 1.0 or 3.0 second period, and an instrumental intensity reported by US Geological Survey; and wherein the indexing module is further configured to determine the earthquake indices from one of JMA instrumental intensity values, JMA Shindo intensity values derived from the JMA instrumental intensity values, spectral response measurements, and instrumental intensity reported by US Geological Survey.

14. A computer-implemented method of determining a regional impact of earthquake events, the method comprising:
associating each geographical region from a set of defined geographical regions with a group of reference measuring stations selected from a plurality of seismological measuring stations distributed in the respective geographical region;
receiving from the reference measuring stations, for an earthquake event, instrumental intensity values indicative of a local strength of seismic motion; and
determining earthquake indices indicative of the regional impact of the earthquake event, the earthquake indices including at least a regional index for each of the geographical regions, each regional index being determined from the instrumental intensity values received from the reference measuring stations associated with the respective geographical region, and each of the instrumental intensity values being weighted with a weighting factor assigned to the reference measuring station having provided the instrumental intensity value.

15. The method according to claim 14, wherein each of the instrumental intensity values is weighted with a weighting factor that is based on a local replacement value associated with the measuring station having provided the instrumental intensity value.

16. The method according to claim 14, wherein the weighting factor is set to zero for a reference measuring station not having provided an instrumental intensity value for the earthquake event.

17. The method according to claim 14, wherein each of the instrumental intensity values is weighted with a weighting factor that is based on a height of the instrumental intensity value measured at the respective measuring station.

18. The method according to claim 14, wherein determining the earthquake indices further includes determining for the earthquake event an aggregated index for a group of more than one of the geographical regions based on the regional indices of each of the geographical regions included in the group.

19. The method according to claim 18, wherein determining the earthquake indices further includes determining for the earthquake event a market index for the set of defined geographical regions based on the regional index and a regional replacement value associated with each of the defined geographical regions.

20. The method according to claim 14, wherein the method further includes, prior to receiving the instrumental intensity values, requesting the instrumental intensity values from the reference measuring stations at a defined period of time after occurrence of the earthquake event.

21. The method according to claim 14, wherein the method further includes, receiving the instrumental intensity values from the reference measuring stations associated with a secondary backup network in cases when at least a defined portion of the reference measuring stations associated with a primary network fail to provide an instrumental intensity value.

22. The method according to claim 14, further comprising displaying the earthquake indices for one or more earthquake event on a user interface accessible for users via a telecommunications network.

23. The method according to claim 14, further comprising receiving from a user specification instructions for selecting one or more of the defined geographical regions to be associated with a structured financial instrument, for defining one or more maximum payout values for the defined geographical regions selected for the structured financial instrument, and for defining one or more payout patterns for the defined geographical regions selected for the structured financial instrument, a payout pattern relating payout portions to instrumental intensity values.

24. The method according to claim 23, further comprising calculating a premium for the structured financial instrument based on a probabilistic earthquake model and the specification instructions, possible correlations of the regional indices for individual earthquake events being considered in calculating the premium.

25. The method according to claim 23, further comprising determining for a user an estimated payout based on the specification instructions and at least one of historical earthquake events and hypothetical earthquake events.

26. The method according to claim 14, wherein the instrumental intensity values are one of JMA instrumental intensity values, JMA Shindo intensity values, spectral response measurements at 0.3, 1.0 or 3.0 second period, and an instrumental intensity reported by US Geological Survey; and wherein the indexing module is further configured to determine the earthquake indices from one of JMA instrumental intensity values, JMA Shindo intensity values derived from the JMA instrumental intensity values, spectral response measurements, and instrumental intensity reported by US Geological Survey.

27. A computer readable medium including a computer program code for controlling a computer such that the computer performs a method comprising:

associating each geographical region from a set of defined geographical regions with a group of reference measuring stations selected from a plurality of seismological measuring stations distributed in the respective geographical region;

receiving from the reference measuring stations, for an earthquake event, instrumental intensity values indicative of a local strength of seismic motion; and determining earthquake indices indicative of the regional impact of the earthquake event, the earthquake indices including at least a regional index for each of the geographical regions, each regional index being determined from the instrumental intensity values received from the reference measuring stations associated with the respective geographical region, and each of the instrumental intensity values being weighted with a weighting factor assigned to the reference measuring station having provided the instrumental intensity value.

28. The computer program readable medium according to claim 27, wherein said method further comprises:

weighting each of the instrumental intensity values with a weighting factor that is based on a local replacement value associated with the measuring station having provided the instrumental intensity value.

29. The computer readable medium according to claim 27, wherein said method further comprises:

setting to zero the weighting factor for a reference measuring station not having provided an instrumental intensity value for the earthquake event.

30. The computer readable medium according to claim 27, wherein said method further comprises:

weighting each of the instrumental intensity values with a weighting factor that is based on a height of the instrumental intensity value measured at the respective measuring station.

31. The computer readable medium according to claim 27, wherein said method further comprises:

determining for the earthquake event an aggregated index for a group of more than one of the geographical regions based on the regional indices of each of the geographical regions included in the group.

32. The computer readable medium according to claim 27, wherein said method further comprises:

determining for the earthquake event a market index for the set of defined geographical regions based on the regional index and a regional replacement value associated with each of the defined geographical regions.

33. The computer readable medium according to claim 27, wherein said method further comprises:

prior to receiving the instrumental intensity values, requesting the instrumental intensity values from the reference measuring stations at a defined period of time after occurrence of the earthquake event.

34. The computer readable medium according to claim 27, wherein said method further comprises:

receiving the instrumental intensity values from the reference measuring stations associated with a secondary backup network in cases when at least a defined portion of the reference measuring stations associated with a primary network fail to provide an instrumental intensity value.

35. The computer readable medium according to claim 27, wherein said method further comprises:

displaying the earthquake indices for one or more earthquake event on a user interface accessible for users via a telecommunications network.

36. The computer readable medium according to claim 27, wherein said method further comprises:

receiving from a user specification instructions for selecting one or more of the defined geographical regions to be associated with a structured financial instrument, for defining one or more maximum payout values for the defined geographical regions selected for the structured financial instrument, and for defining one or more payout patterns for the defined geographical regions selected for the structured financial instrument, a payout pattern relating payout portions to instrumental intensity values.

37. The computer readable medium according to claim 36, wherein said method further comprises:

calculating a premium for the structured financial instrument based on a probabilistic earthquake model and the specification instructions, possible correlations of the regional indices for individual earthquake events being considered in calculating the premium.

38. The computer readable medium according to claim 36, wherein said method further comprises:

determining for a user an estimated payout based on the specification instructions and at least one of historical earthquake events and hypothetical earthquake events.

* * * * *